(12) United States Patent
Sekiya et al.

(10) Patent No.: US 8,286,496 B2
(45) Date of Patent: Oct. 16, 2012

(54) FLUID PRESSURE SENSOR INCORPORATING FLEXIBLE CIRCUIT BOARD

(75) Inventors: Haruhiko Sekiya, Tokyo (JP); Shuji Tohyama, Tokyo (JP); Hironori Kobayashi, Tokyo (JP); Nobuhiko Akimoto, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 353 days.

(21) Appl. No.: 12/706,376

(22) Filed: Feb. 16, 2010

(65) Prior Publication Data
US 2010/0206085 A1 Aug. 19, 2010

(30) Foreign Application Priority Data

Feb. 17, 2009 (JP) ................................. 2009-034044
Feb. 17, 2009 (JP) ................................. 2009-034045

(51) Int. Cl.
*G01L 9/00* (2006.01)
(52) U.S. Cl. ............................... 73/723; 73/715; 73/756
(58) Field of Classification Search ........................ None
See application file for complete search history.

(56) References Cited

U.S. PATENT DOCUMENTS

| | | | |
|---|---|---|---|
| 6,227,055 B1 * | 5/2001 | Pitzer ............................... | 73/715 |
| 6,453,747 B1 * | 9/2002 | Weise et al. ...................... | 73/715 |
| 6,584,851 B2 * | 7/2003 | Yamagishi et al. ............... | 73/715 |
| 6,609,427 B1 * | 8/2003 | Westfield et al. ................ | 73/753 |
| 6,672,170 B1 * | 1/2004 | DiPaola ............................ | 73/717 |
| 6,715,357 B2 * | 4/2004 | Ishiguro et al. .................. | 73/715 |
| 6,742,397 B2 * | 6/2004 | Parker .............................. | 73/756 |
| 6,889,554 B2 * | 5/2005 | Hirota et al. ..................... | 73/719 |
| 6,978,678 B2 * | 12/2005 | Lohmeier et al. ............... | 73/721 |
| 7,073,375 B2 * | 7/2006 | Parker et al. .............. | 73/114.76 |
| 7,159,464 B2 * | 1/2007 | Tohyama et al. ............... | 73/706 |
| 7,168,325 B2 * | 1/2007 | Yoshino .......................... | 73/754 |
| 7,191,658 B2 * | 3/2007 | Oda et al. ........................ | 73/702 |
| 7,370,536 B2 * | 5/2008 | Ueyanagi et al. ................ | 73/754 |
| 7,600,433 B2 * | 10/2009 | Koehler et al. .................. | 73/756 |

FOREIGN PATENT DOCUMENTS

| | | |
|---|---|---|
| JP | H01-179236 U | 12/1989 |
| JP | 11-148880 | 6/1999 |
| JP | 11-201852 | 7/1999 |
| JP | 11-237291 | 8/1999 |
| JP | 2005-147795 A | 6/2005 |
| JP | 2008-224512 | 9/2008 |
| JP | 2008-241343 | 10/2008 |

* cited by examiner

*Primary Examiner* — Lisa Caputo
*Assistant Examiner* — Jermaine Jenkins
(74) *Attorney, Agent, or Firm* — Rankin, Hill & Clark LLP

(57) ABSTRACT

In a sensor, a joint is provided with a sensor module, and the sensor module is accommodated in a housing. The housing is provided with a terminal, and a flexible circuit board electrically connects a diaphragm of the sensor module with the terminal. The joint is also provided with a cap-shaped base, and the top of the base is provided with an opening through which the diaphragm is exposed. A lateral surface of the base, which is crosswise with the top where the opening is provided, is provided with a part of the flexible circuit board, and the part is provided with an electronic component. With this arrangement, no plate-shaped circuit board for mounting the electronic component is required, thereby reducing the manufacturing cost. Moreover, since the electronic component is provided on the lateral surfaces of the base, the base and the electronic component are horizontally arranged.

10 Claims, 5 Drawing Sheets

FLUID PRESSURE SENSOR INCORPORATING FLEXIBLE CIRCUIT BOARD

The entire disclosure of Japanese Patent Applications No. 2009-034044 and No. 2009-034045 filed Feb. 17, 2009 are expressly incorporated by reference herein.

BACKGROUND OF THE INVENTION

1. Field of the Invention

The present invention relates to pressure sensors and other sensors for measuring a fluid pressure.

2. Description of Related Art

For measurement of fluid pressures, pressure sensors are used. One of such pressure sensors includes: a joint provided with a port for introducing a target fluid; and a sensor module provided on the joint and having a diaphragm displaceable by a pressure of the introduced fluid, and converts the displacement of the diaphragm into signals for outputting.

As such a pressure sensor, Traditional Example 1 is known, according to which the sensor module is accommodated within a case and a circuit board is positioned on the sensor module (Document 1: JP-A-11-148880). In Traditional Example 1, the circuit board is held in a resin holder and connected to a connector via a connecting pin, so that the signals generated in the circuit board are outputted to the outside from the connector.

Further, as pressure sensors having sensor modules, Traditional Examples 2 and 3 are known, according to which a first end of a flexible circuit board is connected to the sensor module and a second end of the flexible circuit board is connected to the circuit board (Document 2: JP-A-2008-241343, Document 3: JP-A-2008-224512).

In Traditional Examples 2 and 3, the diaphragm of the sensor module is provided with a cap, so that the first end of the flexible circuit board is wired around the cap. The second end of the flexible circuit board is connected to a circuit board spaced away from the sensor module. Electronic components are provided on the upper surface of the circuit board.

Still further, as pressure sensors having sensor modules, Traditional Examples 4 and 5 are known. According to these examples, a bottom of a bottomed cylindrical case is attached to the joint while a circuit board is provided at an open-end side of the case, and electric circuit components are provided on the circuit board so as to oppose to a diaphragm of the sensor module (Document 4: JP-A-11-201852, Document 5: JP-A-11-237291)

In Traditional Examples 4 and 5, the bottom of the case contacts the joint, and this bottom is provided with an opening for allowing an insertion of the sensor module. The opening of the bottom is provided with an engaging projection for positioning the case on the joint, and the outer circumference of the engaging projection is locked with a wall of a groove formed in the joint.

Traditional Example 1 employs a layer structure in which the circuit board is positioned on the sensor module and the connector is positioned on the circuit board via the connecting pin. With this structure, a height dimension of the sensor (height from the sensor module to the connector) is increased, which invites increase in the size of the pressure sensor.

Traditional Examples 2 and 3 employ structures in which the cap is provided on the sensor module, the circuit board is positioned away from the cap and the flexible circuit board is positioned between the circuit board the cap. With this structure, as in Traditional Example 1, a dimension from the sensor module to the circuit board is increased, which invites increase in the size of the pressure sensor. Moreover, the above structures require a separate circuit board for mounting electronic components in addition to the flexible circuit board, which invites increase in manufacturing cost.

Traditional Examples 4 and 5 employ layer structures in which the circuit board is provided on the sensor module and the electric circuit components are provided on the circuit board to oppose to the sensor module, so that the height dimension of the sensor is increased. In this respect, according to Traditional Examples 4 and 5, the joint is provided with the groove, and the engaging projection of the case is engaged with the groove. However, the groove and the engaging projection are for positioning, and thus the height dimension of the sensor is increased all the same.

Further, Traditional Examples 4 and 5 require the case to have a complicated shape, according to which the bottom of the case is open and the opening portion is provided with the engaging projection for positioning the case on the joint. Hence, the structure of the case per se becomes complicated, which invites increase in manufacturing cost.

SUMMARY OF THE INVENTION

An aspect of the invention provides a sensor capable of downsizing at low cost.

A sensor according to an aspect of the invention includes: a joint provided with a port for introducing a target fluid; a sensor module provided on the joint and including a detector displaceable by a pressure of the introduced fluid; a housing accommodating the sensor module and provided with a terminal; a flexible circuit board for electrically connecting the detector of the sensor module with the terminal; and a cap-shaped base provided on the joint, a top of the base being provided with an opening through which the detector of the sensor module is exposed, a lateral surface of the base being provided with a part of the flexible circuit board, the lateral surface being crosswise with the top provided with the opening, the part of the flexible circuit board being provided with an electronic component.

In the aspect of the invention, the joint is provided with the sensor module, the base is positioned such that the detector of the sensor module is exposed through the opening, and the opening end of the base is jointed to the joint. A part of the flexible circuit board is exemplarily bonded to the lateral surface of the base. The part of the flexible circuit board exemplarily bonded to the lateral surface of the base is provided with the electronic component in advance. Alternatively, after the bonding fixation of the flexible circuit board, the electronic component may be provided thereon. Then, by wire bonding or the like, the first end of the flexible circuit board is electrically connected to the detector of the sensor module exposed through the opening of the base, and the second end of the flexible circuit board is electrically connected to the terminal provided on the housing in advance. The sensor module is then covered by the housing.

According to the aspect of the invention, since the electronic components are provided on the flexible circuit board, no circuit board for mounting the electronic component is required. Therefore, manufacturing cost can be reduced. Furthermore, the electronic component is provided on the lateral surface of the base, so that the base and the electronic component are horizontally arranged. Thus, the hitherto-employed layer structure can be avoided, which reduces the height dimension of the sensor and realizes a downsizing.

Preferably in the aspect of the invention, the electronic component includes an amplifier circuit, and the amplifier circuit is positioned closer to the joint than the detector of the sensor module.

According to the aspect of the invention, the amplifier circuit, which is of larger size than other electronic components, is positioned closer to the joint than the detector of the sensor module, which can realize a downsizing of the sensor more efficiently.

Preferably in the aspect of the invention, the lateral surface of the base is flat.

In the aspect of the invention, by making the lateral surface of the base flat, the electronic component, which is to be provided on the lateral surface of the base via the part of the flexible circuit board, can be a typically-used flat-plate component. Accordingly, the electronic component is not required to be structurally modified from a hitherto-employed structure, and thus the sensor can be manufactured at lower cost.

Preferably in the aspect of the invention, a portion crosswise with the lateral surface of the base is provided with a lip portion to be welded to the joint.

According to the aspect of the invention, the joint and the lip portion are superposed with each other, and the superposed portions are welded together. Hence, at the time of welding, the lip portion also determines the positioning of the base, so that the joint and the base can be fixedly welded together at proper positions.

Preferably in the aspect of the invention, a spacer is provided over the base, and the spacer is bonded with the flexible circuit board.

According to the aspect of the invention, since the spacer is bonded with the flexible circuit board, the flexible circuit board is prevented from trembling within the housing at the time of transportation of the sensor. Accordingly, no great force is applied on both ends of the flexible circuit board at the time of transportation of the sensor, thereby preventing the flexible circuit board and the terminal from being spaced away from each other and also preventing the flexible circuit board and the detector of the sensor module from being spaced away from each other. Therefore, inconvenience due to disconnection and the like can be avoided.

A sensor according to another aspect of the invention includes: a joint provided with a port for introducing a target fluid; a sensor module provided on the joint and including a detector displaceable by a pressure of the introduced fluid; an electronic component electrically connected to the sensor module; a circuit board on which the electronic component is provided; and a base on which the circuit board is provided, the base including: a wall of which inner circumference is opposed to an outer circumference of the sensor module; and a leg coplanar with the wall, an end of the leg being inserted in a mounting groove opened in a bottom of the joint where the sensor module is provided, a space being defined between an outer surface of the leg and an outer wall of the mounting groove.

According to the aspect of the invention, the circuit board preliminarily provided with the electronic component is provided on the base, and the leg of the base is inserted in the mounting groove of the joint preliminarily provided with the sensor module. With this arrangement, the sensor module is covered with the base. The space, which is defined between the mounting groove and the leg of the base, may be filled suitably by adhesive and the like where necessary, and the base and the joint are fixed.

Thus, in the aspect of the invention, the leg of the base provided with the electronic component is inserted in the mounting groove of the joint, thereby reducing the height dimension of the base from the bottom of the joint. Accordingly, the height dimension of the sensor is reduced, which contributes to a downsizing.

Preferably in the aspect of the invention, the outer surface of the leg of the base is provided with the electronic component, and the space is wider than a thickness of the electronic component.

According to the aspect of the invention, since the electronic component is provided on the outer surface of the leg of the base, the height of the sensor can be reduced as compared with a sensor in which the electronic component is provided on the top orthogonal to the outer circumference of the base.

Preferably in the aspect of the invention, the wall of the base includes: a wall body; and a lip portion provided on an end of the wall body and engaged with a vicinity of an outer circumference of the mounting groove of the joint.

According to the aspect of the invention, by engaging the lip portion of the base with the vicinity of the outer circumference of the mounting groove of the joint, the positioning of the base with respect to the joint can be facilitated. Accordingly, the sensor can be easily assembled.

Preferably in the aspect of the invention, the lip portion is bent outwardly from the wall body to abut on the vicinity of the outer circumference of the mounting groove of the joint.

According to the aspect of the invention, by bending the lip portion with respect to the wall body, the base can be easily manufactured.

Preferably in the aspect of the invention, the lip portion is provided at two opposing positions while the leg includes a pair of legs provided at positions crosswise with the lip portion, and the pair of legs each intermediately include a narrow portion of which width dimension is reduced.

According to the aspect of the invention, two lip portions are positioned to oppose to each other, and two legs are likewise positioned to oppose to each other. Thus, at the time of welding the base to the joint, a force can be applied uniformly on the base, and a concentration of the force on a particular point can be avoided. Therefore, damages to the base can be prevented. Moreover, since the legs each include the narrow portion, the base can be easily inserted in the mounting groove by holding the base obliquely to the bottom of the joint while locking the narrow portion to the opening edge of the mounting groove of the joint, and by subsequently rotating the base around the locked portion. Further, by filling adhesive in between the legs of the base and the mounting groove, the adhesive locks the narrow portion. With this arrangement, disengagement of the base can be increasingly prevented.

DETAILED DESCRIPTION OF PREFERRED EMBODIMENT(S)

Exemplary embodiment(s) of the invention will be described below with reference to the attached drawings.

Figure 1:
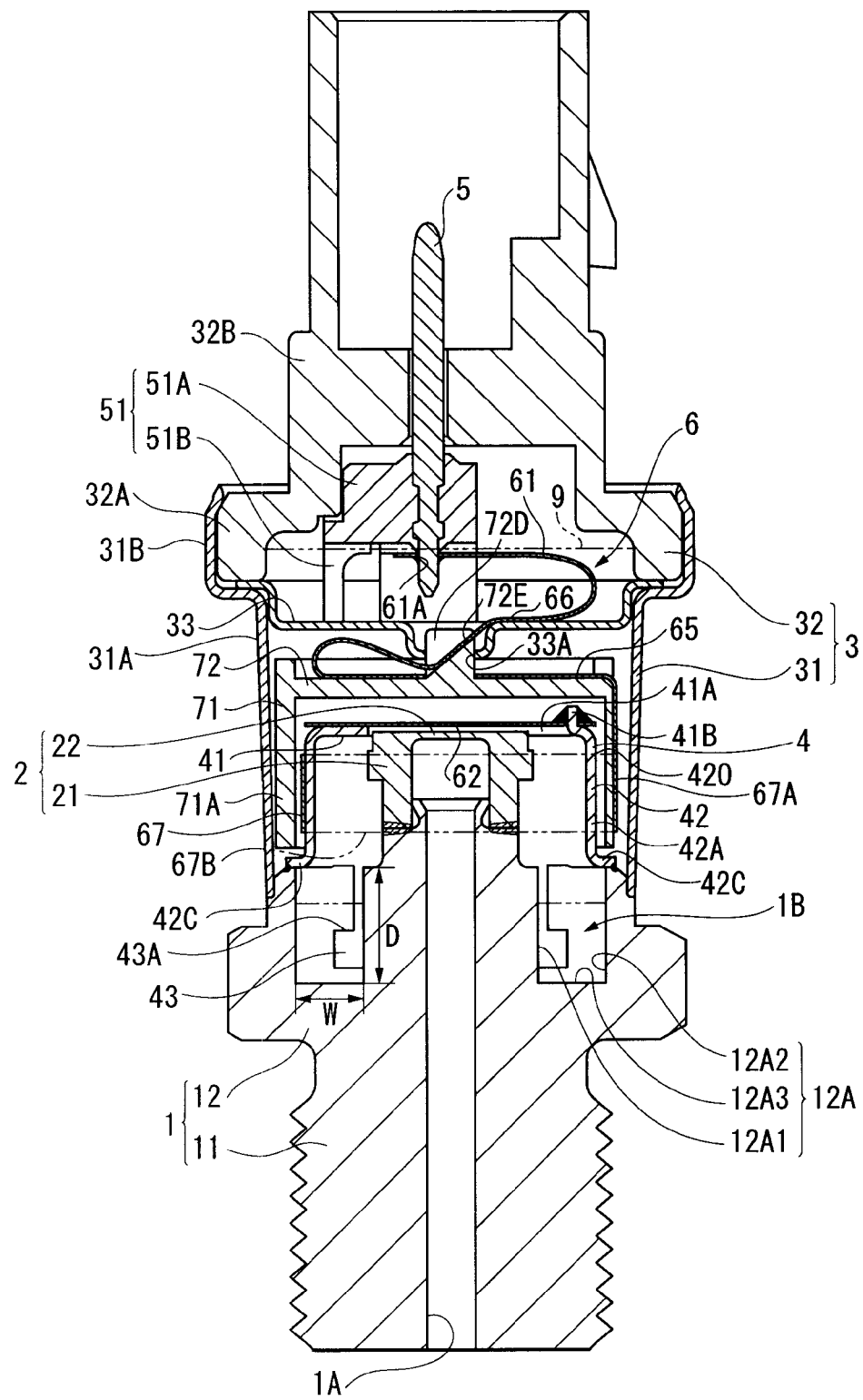
FIG. 1 is a front cross-sectional view showing a sensor according to an exemplary embodiment of the invention.
Figure 2:
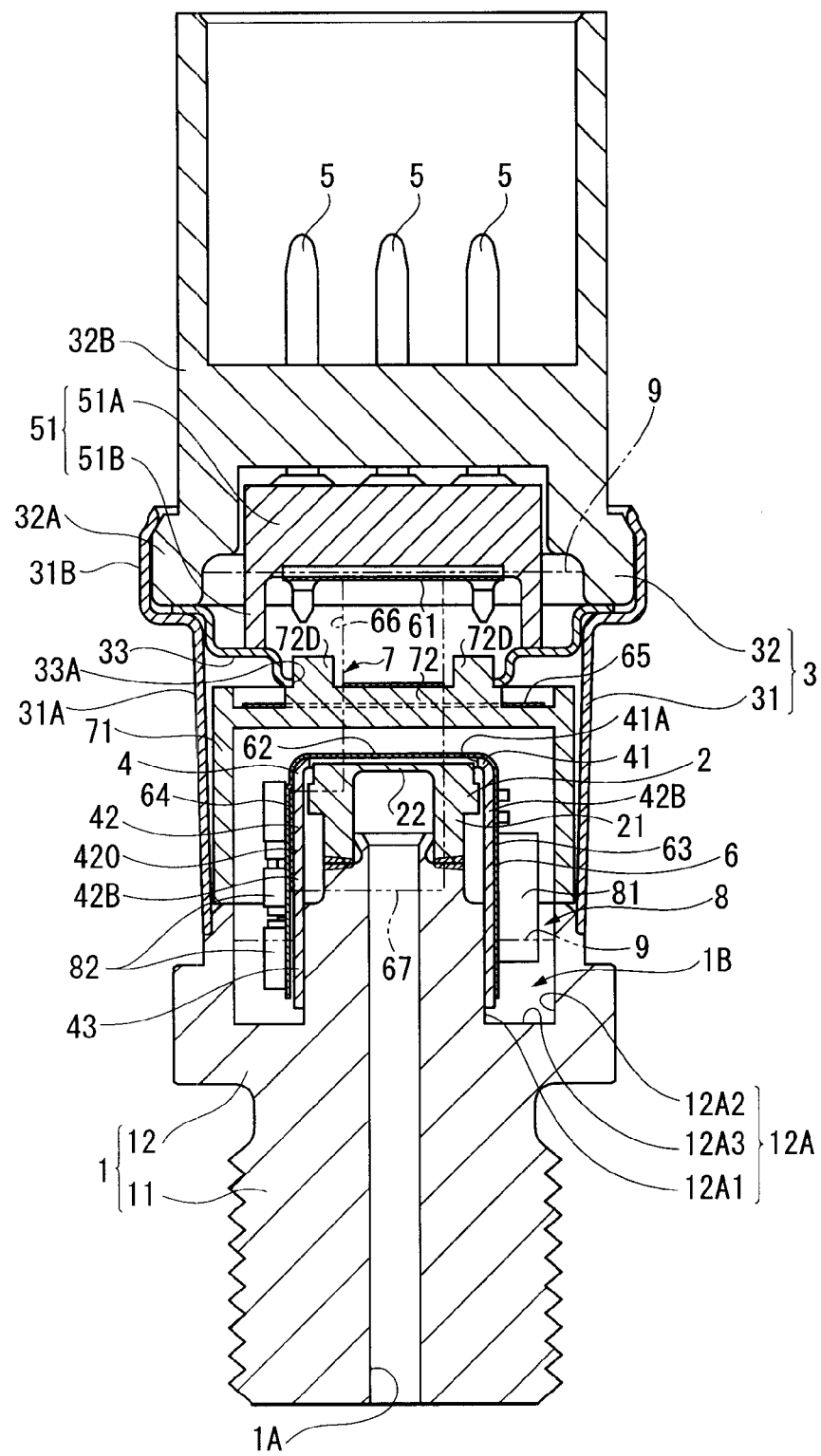
FIG. 2 is a lateral cross-sectional view showing the sensor.

FIG. 1 is a front cross-sectional view showing a sensor according to this exemplary embodiment of the invention, and FIG. 2 is a lateral cross-sectional view showing the sensor.

In FIGS. 1 and 2, the sensor includes: a joint 1; a sensor module 2 provided on the joint I; a housing 3 for accommodating the sensor module 2; a cap-shaped base 4 accommodated within the housing 3 to be provided on the joint 1; a terminal 5 provided on the housing 3; a flexible circuit board 6 for electrically connecting the terminal 5 with the sensor module 2; a spacer 7 on which the flexible circuit board 6 is partially supported; and an electronic component 8 provided on the flexible circuit board 6.

The joint 1 is a metal member having: a shaft 11 provided with a port 1A for introducing a target fluid; and a flange 12 radially extending from a middle portion of the shaft 11.

A first end of the shaft 11 is formed as a thread to be threaded into a mounted portion (not shown), and a second end of the shaft 11 is jointed with the sensor module 2.

In the flange 12, a mounting groove 12A is annularly formed at a bottom where the sensor module 2 is provided. The mounting groove 12A, which is a space having a rectangular cross section, is defined by: an inner wall 12A1 having a diameter substantially equal to the outer circumferential diameter of the sensor module 2; an outer wall 12A2 concentric with the inner wall 12A1; and a bottom 12A3 connecting the lower edges of the inner wall 12A1 and the outer wall 12A2. D denotes the depth of the mounting groove 12A while W denotes the width.

The sensor module 2 is a metal member in which a cylindrical portion 21 jointed to the second end of the joint 1 (e.g., welded to the second end) is integrated with a diaphragm 22 (a detector provided on a first end of the cylindrical portion 21).

The diaphragm 22 includes a strain gauge and the like (not shown) for detecting a pressure of the introduced fluid.

The housing 3 includes: a cylindrical metal case 31 of which first end opening is jointed to the flange 12 by welding; and a synthetic-resin connector 32 provided on a second end of the case 31.

The case 31 includes: a cylindrical portion 31A for accommodating the sensor module 2; and a large-diameter portion 31 B of which first end is connected to an end of the cylindrical portion 31A for supporting the connector 32. A second end of the large-diameter portion 31B is opened.

The connector 32 includes: an annular connector base 32A supported by the large-diameter portion 31B; and a connector body 32B integrated with the connector base 32A and mounted with the terminal 5.

The connector body 32B is partitioned into two chambers by a portion mounted with the terminal 5: the first chamber is a recess for defining the internal space of the housing 3 and the second chamber is a guide recess for guiding a socket (not shown).

The large-diameter portion 31B is closed by a lid 33 made of a metal disk member. The periphery of the lid 33 is held between the large-diameter portion 31B and the connector base 32A. The center of the lid 33 is provided with an opening 33A.

Figure 3A:
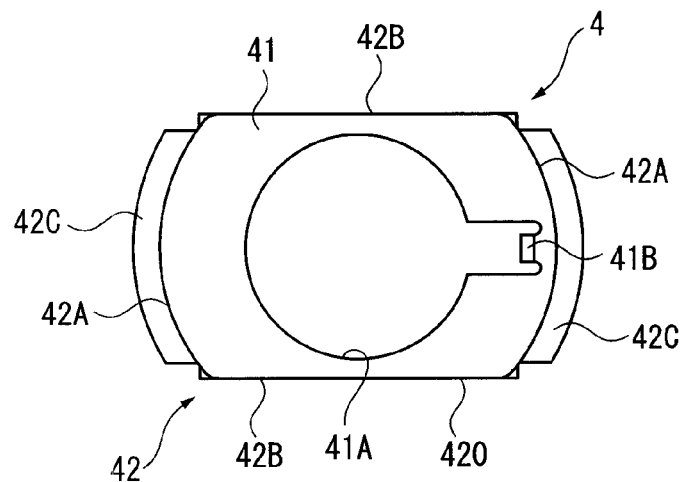
FIG. 3A is a top view showing a base.
Figure 3B:
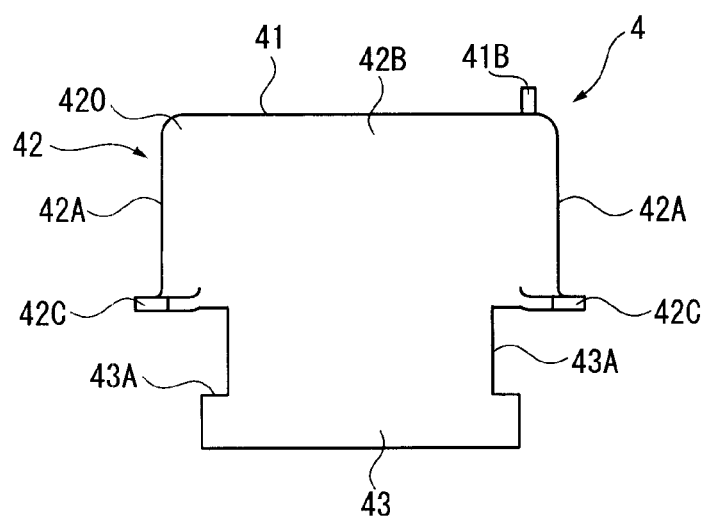
FIG. 3B is a front view showing the base.
Figure 3C:
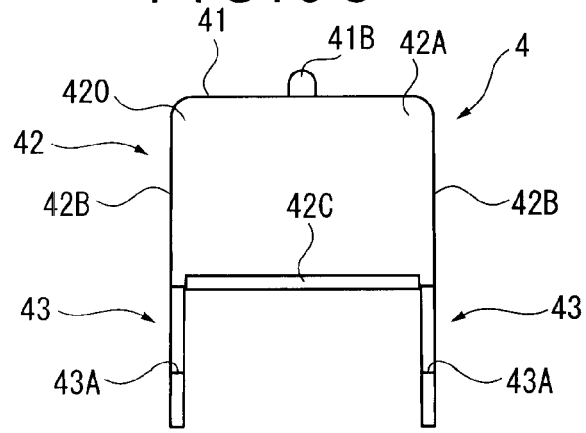
FIG. 3C is a lateral view showing the base.

The structure of the base 4 is shown in FIGS. 3A to 3C. FIG. 3A is a top view of the base 4. FIG. 3B is a front view of the base 4, and FIG. 3C is a lateral view of the base 4.

In FIGS. 1 to 3C, the base 4 is a metal member including: a flat-plate top 41 positioned to oppose to the plane of the diaphragm 22; a wall 42 connected to the top 41 and opposed to the outer circumference of the sensor module 2 at its inner circumference; and legs 43 coplanar with the wall 42.

The top 41 is provided with an opening 41A for exposing the diaphragm 22, through which the diaphragm 22 is electrically connected with an end of the flexible circuit board 6 by wire bonding. The top 41 is provided with a locking projection 41B for locking the flexible circuit board 6.

The planar shape of the top 41 is defined by a pair of arc sections opposed to each other and a pair of linear sections connecting the ends of the arc sections.

The wall 42 includes: curved portions 42A shaped to conform to the arc sections of the top 41; flat-plate lateral portions 42B connecting the curved portions 42A; and lip portions 42C bent outwardly from ends of the curved portions 42A. In this exemplary embodiment, the curved portions 42A and the lateral portions 42B provide a wall body 420. The lip portions 42C are positioned at two opposing positions. The legs 43 are positioned crosswise with the lip portions 42C.

The lip portions 42C are to be engaged with the vicinity of the outer wall 12A2 of the mounting groove 12A of the flange 12. Their planar shape is arc so as to conform to the curved portions 42A. The lip portions 42C are locked with the flange 12 to be jointed by welding.

The legs 43, which each are a flat-plate member having an outer surface substantially coplanar with the outer surface of the lateral portions 42B, are to be inserted into the mounting groove 12A at their distal ends. The outer circumference of the legs 43 and the outer wall 12A2 of the mounting groove 12A define a space 1B.

The legs 43 each include a narrow portion 43A of which width dimension is reduced, and the narrow portion 43A extends from the vicinity of the lip portions 42C to middle portions of the legs 43. The narrow portion 43A is shaped such that a flat surface is cut out in a C shape at two opposing positions.

The terminal 5 is mounted on a synthetic-resin mounting member 51 by insert molding. The mounting member 51, which is shaped like a saddle, includes a body 51A for supporting the terminal 51 and leg 51B integrated with both sides of the body 51A. The lid 33 supports the leg 51B. In this exemplary embodiments, three terminals 5 are arranged in a longitudinal direction of the body 51A.

Ends of the terminals 5 are exposed from the body 51A of the mounting member 51, so that the exposed portions of the terminals 5 are connected with a first end of the flexible circuit board 6.

Figure 4:
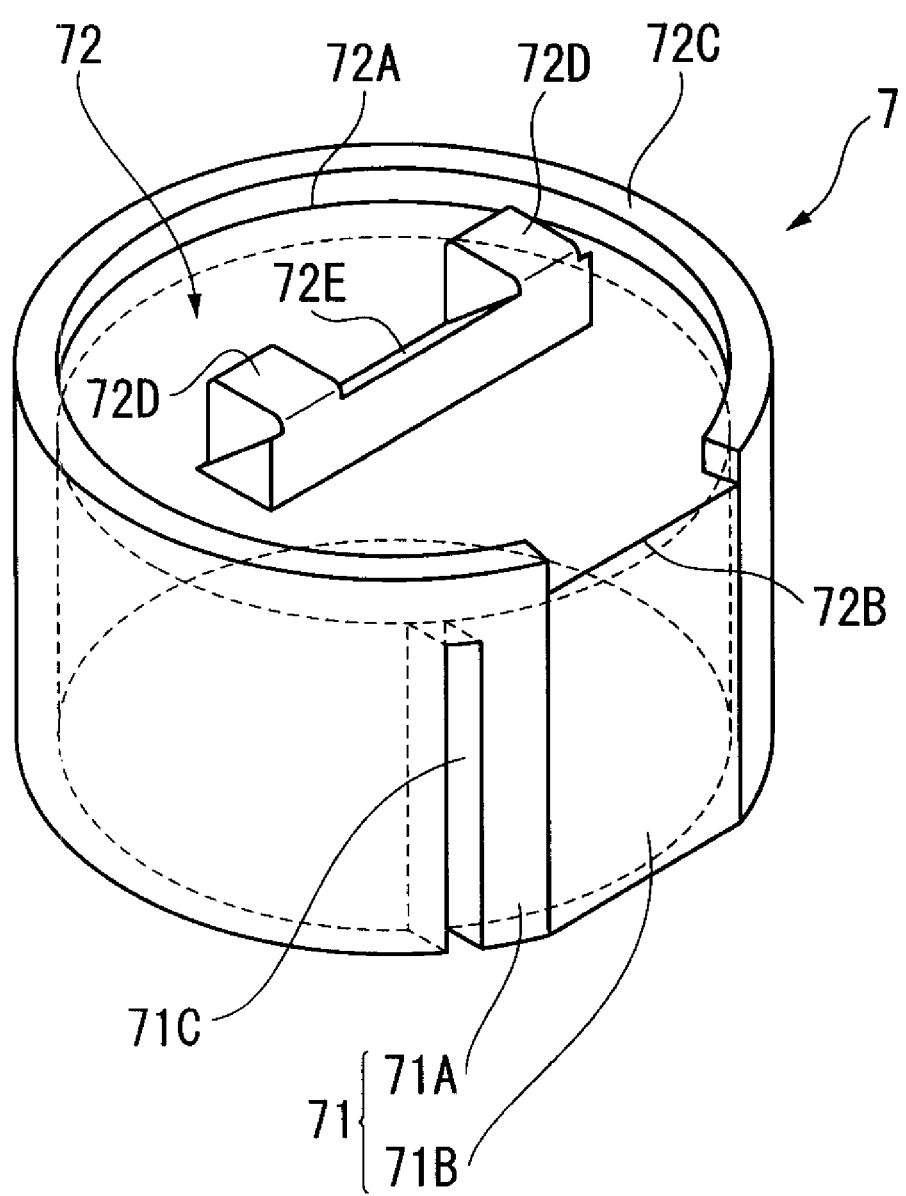
FIG. 4 is a perspective view showing a spacer.

Structural details of the spacer 7 are shown in FIG. 4. FIG. 4 is a perspective view showing the spacer 7.

In FIGS. 1, 2 and 4, the spacer 7, which is for covering the base 4, includes: a cylindrical portion 71 of which first end is engaged with or bonded to the flange 12 of the joint 1; a top table 72 for closing a second end of the cylindrical portion 71.

The cylindrical portion 71 is opposed to the inner circumference of the case 31 at its outer circumference, and provided by integrating a circular cylindrical portion 71A with a flat plate 71B. The circular cylindrical portion 71A, which has an inner circumference that defines substantially the same arc shape as the outer wall 12A2, is partially cut out axially. The flat plate 71B connects the cut-out portion of the circular cylindrical portion 71A. The cylindrical portion 71 is also provided with an insert groove 71C for receiving an insertion of the flexible circuit board 6. The insert groove 71C extends from an open end of the circular cylindrical portion 71A by a predetermined length in the axis direction of the circular cylindrical portion 71A.

The top plate 72, of which shape conforms to that of the end surface of the cylindrical portion 71, has an arc portion 72A conforming to the circular cylindrical portion 71A and a linear portion 72B conforming to the flat plate 71B.

A rise portion 72C is formed along an outer edge of the arc portion 72A, and cut out at a position corresponding to the linear portion 72B. The top plate 72 is centrally provided with two engaging projections spaced apart from each other for engaging the flexible circuit board 6. A taper surface 72E is provided between the engaging projections 72D for supporting the flexible circuit board 6.

Figure 5:
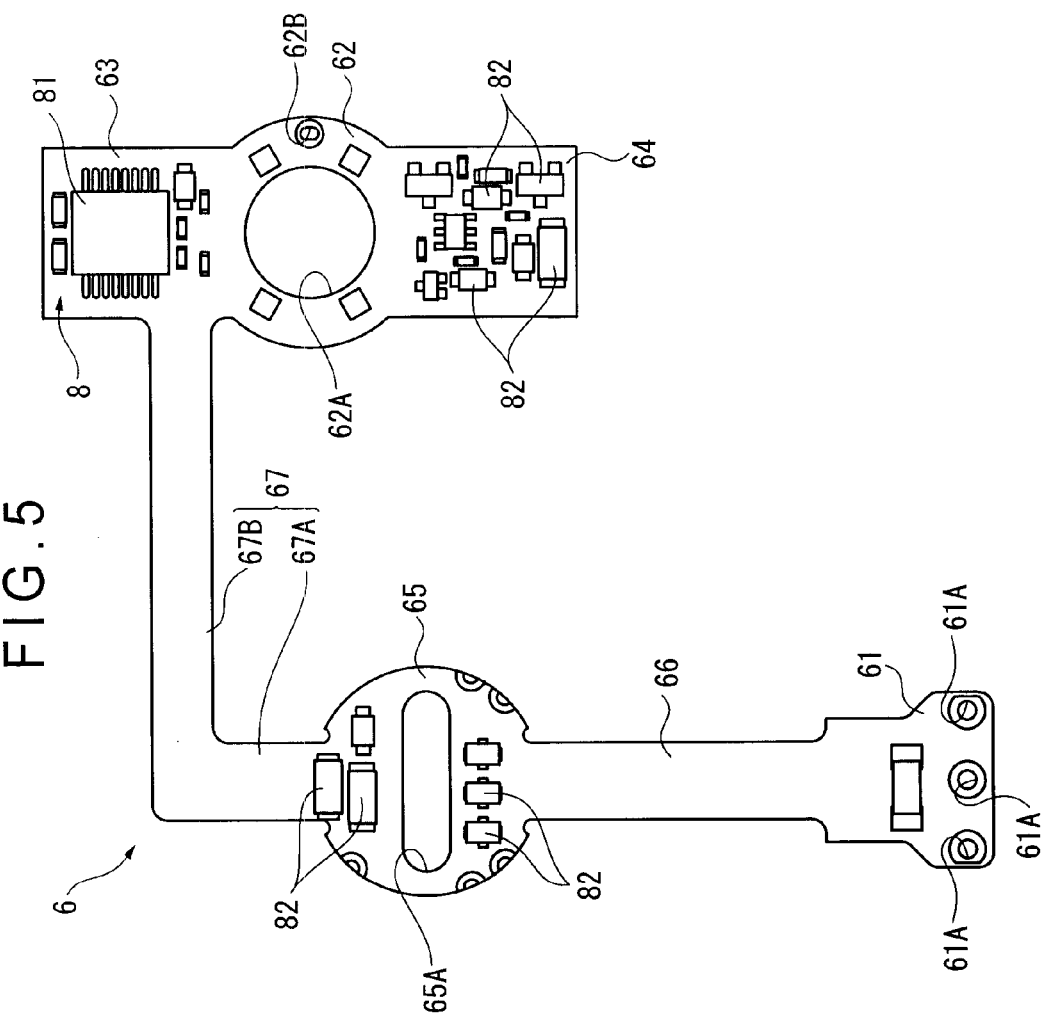
FIG. 5 is an expansion plan showing a flexible circuit board.

Structural details of the flexible circuit board 6 are shown in FIG. 5. FIG. 5 is an expansion plan showing the flexible circuit board 6.

In FIGS. 1, 2 and 5, the flexible circuit board 6 includes: a first end 61 connected to the terminal 5; a second end 62 connected to the diaphragm 22; a first mounting surface 63 and a second mounting surface 64 provided at opposite positions with the interposition of the second end 62; a middle surface 65 provided between the first mounting surface 63 and the first end 61 and bonded to the top plate 72 of the spacer 7; a first connected portion 66 for connecting the middle surface 65 with the first end 61; and a second connected portion 67 for connecting the first mounting surface 63 with the middle surface 65.

The first end 61 is provided with engaging holes 61A to be engaged with the terminal 5. In this exemplary embodiment, in order to reinforce the connection between the first end 61 and the terminal 5, an adhesion layer 9 made of adhesive may be provided in a space between the lid 33 and the connector 32.

The second end 62, which is fixed on the top 41 of the base 4 by thermocompression, has a contour conforming to the planar shape of the top 41. The second end 62 is internally provided with an opening 62A for exposing the diaphragm 22. The second end 62 includes an engaging hole 62B to be engaged with the locking projection 41B of the top 41. The locking projection 41B inserted through the engaging hole 62B is fixedly bonded to the second end 62 by soldering or conductive adhesive, thereby electrically connecting the flexible circuit board 6 with the housing 3.

The first mounting surface 63 is fixedly bonded to outer surfaces of the lateral portion 42B and the leg 43 of the base 4 on a first side while the second mounting surface 64 is fixedly bonded to outer surface of the lateral portion 42B and the leg 43 of the base 4 on a second side. The first mounting surface 63 and the second mounting surface 64 may be bonded to the lateral portions 42B and the leg 43 by attaching the first and second mounting surfaces 63 and 64 to the lateral portions 42B and the leg 43 with use of an adhesive tape preliminarily attached on between the first and second mounting surfaces 63 and 64. Alternatively, the bonding may be performed by applying adhesive to the lateral portions 42B and the leg 43 and subsequently attaching the first and second mounting surfaces 63 and 64 thereto.

As shown in FIG. 2, when mounted on the base 4, the first mounting surface 63 and the second mounting surface 64 are bent at a right angle with respect to the second end 62 and opposed to the outer wall 12A2 of the mounting groove 12A. The first mounting surface 63 is provided with an amplifier circuit 81 (an example of the electronic component 8), and the second mounting surface 64 is provided with a plurality of electronic circuits 82 (electronic component). The amplifier circuit 81 is provided externally to the lateral portion 42B and the legs 43, and opposed to the outer wall 12A2 of the mounting groove 12A and the inner circumference of the spacer 7 at a position closer to the joint than the diaphragm 22 of the sensor module 2. In other words, the space 1B of the mounting groove 12A is wider than the thickness of the amplifier circuit 81. Likewise, the electronic circuits 82 are provided externally to the lateral portion 42B and the legs 43, and opposed to the outer wall 12A2 of the mounting groove 12A and the inner circumference of the spacer 7. In other words, the space 1B of the mounting groove 12A is wider than the thickness of the electronic circuits 82. In this exemplary embodiment, the adhesion layer 9 made of adhesive or molding materials may be provided to the mounting groove 12A in order to reinforce the bonding of the first and second mounting surfaces 63 and 64 with the lateral portions 42B and the leg 43 or to reinforce the connection of the amplifier circuit 81 and the electronic circuits 82 with the flexible circuit board 6.

The middle surface 65, which has a planar shape substantially conforming to that of the top plate 72, has a long hole 65A to be engaged with the engaging projections 72D of the top plate 72. In the middle surface 65, a plurality of electronic circuits 82 are provided to surround the long hole 65A. The middle surface 65 may be bonded to the top plate 72 by attaching the middle surface 65 to the top plate 72 with use of an adhesive tape preliminarily attached to the middle surface 65, or alternatively by applying adhesive to the top plate 72 and subsequently attaching the middle surface 65 thereto.

The first connected portion 66 is bent at a position closer to the middle surface 65 so as to be accommodated between the top plate 72 and the lid 33. The bent portion is supported by the taper surface 72E formed between the engaging projections 72D (see, FIG. 1).

The second connected portion 67 includes: a short portion 67A provided opposite to the first connected portion 66 with the interposition of the middle surface 65; and a long portion 67B bent at a right angle from the short portion 67A to extend toward the first mounting surface 63. The short portion 67A is bonded to the flat plate 71B of the spacer 7 (see, FIG. 1). The short portion 67A may be bonded to the flat plate 71B by attaching the short portion 67A to the flat plate 71B with use of an adhesive tape preliminarily attached to the short portion 67A in a manner continuous from the middle portion 65, or alternatively by applying adhesive to the flat plate 71B and subsequently attaching the short portion 67A thereto.

The long portion 67B is positioned to oppose to the outer circumference of the wall 42 of the base 4 at a portion neighboring the first mounting surface 63 while following the outer circumference of the cylindrical portion 71 of the spacer 7 at a portion neighboring the short portion 67A. An intermediate portion of the long portion 67B is inserted through the insert groove 71C. The long portion 67B does not protrude above the top 41 of the base 4 at its lateral edge.

Accordingly, this exemplary embodiment exemplarily provides the following advantages.

(1) The joint 1 is provided with the sensor module 2, and the sensor module 2 is accommodated in the housing 3. The housing 3 is provided with the terminal 5, and the flexible circuit board 6 electrically connects the diaphragm 22 of the sensor module 2 with the terminal 5. The joint 1 is also provided with the cap-shaped base 4, and the top of the base 4 is provided with the opening 41A through which the diaphragm 22 is exposed. The lateral surfaces of the base 4, which are crosswise with the top where the opening is provided, are provided with a part of the flexible circuit board 6, and the part is provided with the electronic component 8. With this arrangement, no plate-shaped circuit board for mounting the electronic component 8 is required, thereby reducing the manufacturing cost. Moreover, since the electronic component 8 is provided on the lateral surfaces of the base 4, the base 4 and the electronic component 8 are horizontally arranged without employing the hitherto-employed layer structure. Accordingly, the height dimension of the sensor is reduced. which contributes to a downsizing.

(2) The amplifier circuit 81, which is an example of the electronic component 8 and larger than the other components, is positioned closer to the joint than the diaphragm 22 of the sensor module 2. Therefore, a downsizing of the sensor can be more efficiently realized.

(3) The wall 42 of the base 4 is structured to include the curved portion 42A shaped to conform to the arc sections of the top 41 and the flat-plate lateral portions 42B connecting the curved portions 42A. With this arrangement, the flat-plate lateral portions 42B are positioned at the lateral surfaces of the base 4, so that hitherto-used flat-plate electronic components 8 can be mounted directly on the lateral portions 42B. Accordingly, the electronic components 8 are not required to be structurally modified from the hitherto-employed structures, and thus the sensor can be manufactured at lower cost.

(4) The lip portions 42C are provided at a portion crosswise with the lateral surfaces of the base 4 in order to be welded to the joint 1. With this arrangement, the lip portions 42C and the flange 12 of the joint 1 are welded together by superposing the lip portions 42C and the flange 12 with each other and welding the superposed portions. Accordingly, the positioning of the base 4 can be determined also by the lip portions 42C at the time of welding, and thus the welding can be precisely performed.

(5) The spacer 7 is provided over the base 4, and the middle surface 65 of the flexible circuit board 6 is bonded to the top plate 72 of the spacer 7, which can prevent tremor of the flexible circuit board 6 within the housing 3 at the time of transportation of the sensor. Accordingly, it is possible to prevent the first end 61 of the flexible circuit board 6 and the terminal 5 as well as the second end 62 of the flexible circuit board 6 and the diaphragm 22 from being disconnected from each other due to the tremor.

(6) The top plate 72 is provided with the two engaging projections 72D, and the middle surface 65 is provided with the long hole 65A to be engaged with the engaging projections 72D. With this arrangement, the engaging projections 72D serve also as a positioning member, so that the flexible circuit board 6 can be easily and precisely mounted on the top plate 72.

(7) Since the middle surface 65 and the top plate 72 are fixedly bonded together, the flexible circuit board 6 is not disengaged from the spacer 7 at the time of transportation of the sensor.

(8) The first connected portion 66 between the first end 61 connected to the terminal 5 and the middle surface 65 bonded to the spacer 7 is bent at a position closer to the middle surface 65 to be accommodated between the top plate 72 and the lid 33. Accordingly, the extra length of the first connected portion 66 can compensate the possible error in the length of the first connected portion 66.

(9) The bent portion of the first connected portion 66 is supported by the taper surface 72E formed between the engaging projections 72D. With this arrangement, the first connected portion 66 does not tremble at the time of transportation of the sensor, and thus inconvenience such as disconnection can be avoided.

(10) The flexible circuit board 6 includes: the second end 62 bonded to the top 41 of the base 4; and the first mounting surface 63 and the second mounting surface 64 provided the respective sides of the second end 62, and the electronic components 8 are disposed on the first mounting surface 63 and the second mounting surface 64 by allotment. With this arrangement, the increased number of the electronic components 8 can be efficiently disposed at the lateral surfaces of the base 4, thereby contributing to reduction in the length dimension of the sensor.

(11) The base 4 includes the wall 42 opposed to the outer circumference of the sensor module 2 and the legs 43 coplanar with the wall 42. The ends of the legs 43 are inserted into the mounting groove 12A opened in the bottom of the flange 12 of the joint 1, and the space 1B is defined between the outer surface of the leg 43 and the outer wall 12A2 of the mounting groove 12A. With this arrangement, the legs 43 of the base 4, on which the electronic components 8 are provided, are inserted in the mounting groove 12A of the flange 12, so that the height dimension of the base per se from the bottom of the joint can be reduced. Thus, the height dimension of the sensor can be further reduced, thereby downsizing the sensor.

(12) The electronic components 8 are provided on the outer surface of the leg 43 of the base 4, and the space 1B is wider than the thickness of the electronic components 8. With this arrangement, the height dimension of the sensor can be further reduced as compared with a sensor of which electronic components 8 are provided on the top 41 of the base 4.

(13) The wall 42 of the base 4 includes: the wall body 420; and the lip portions 42C provided at the end of the wall body 420 to be engaged with the vicinity of the outer circumference of the mounting groove 12A. With this arrangement, by engaging the lip portions 42C of the base 4 with the vicinity of the outer circumference of the mounting groove 12A, the positioning of the base 4 with respect to the joint 1 can be conducted in a facilitated manner, thereby facilitating the assembly of the sensor.

(14) The lip portions 42C are bent outwardly from the curved portions 42A of the wall body 420, and the bent portions are engaged with the vicinity of the outer circumference of the mounting groove 12A of the flange 12. Thus, the base 4 can be structurally simplified, thereby facilitating the manufacturing of the base 4.

(15) The lip portions 42C are provided at the two opposing positions, and the legs 43 are provided at two positions crosswise with the lip portions 42C. Thus, when the base 4 is jointed to the flange 12, a force can be uniformly applied on the base 4, so that the force is not concentrated on a particular position. Accordingly, damages to the base can be prevented.

(16) The legs 43 each intermediately include the narrow portion 43A of which width dimension is reduced. Thus, by holding the base 4 obliquely to the bottom of the flange 12 while locking the narrow portion 43A to the opening edge of the mounting groove 12A of the flange 12, and by subsequently rotating the base 4 around the locked portion, the base 4 can be easily inserted in the mounting groove 12A.

(17) By forming the adhesion layer 9 by filling adhesive in between the legs 43 of the A) base 4 and the mounting groove 12A, the adhesive locks the narrow portion 43A. With this arrangement, disengagement of the base 4 can be increasingly prevented.

(18) Since the top 41 of the base 4 is provided with the locking projection 41B for locking the flexible circuit board 6, the flexible circuit board 6 can be easily mounted on the base 4.

(19) The flexible circuit board 6 is provided on the lateral surface of the base 4, the amplifier circuit 81 is provided on the flexible circuit board 6, and the base 4 is welded to the joint 1. Accordingly, the distance between the sensor module 2 and the amplifier circuit 81 is reduced, and the temperature of the measurement medium can be quickly transmitted to the amplifier circuit 81 via the base 4 by heat conduction. Thus, the temperature of the sensor module 2 can be made equal to that of the amplifier circuit 81. With this arrangement, the measurement accuracy can be enhanced.

(20) The flexible circuit board 6 having the amplifier circuit 81 is provided on the lateral surface of the base 4, and the base 4 is welded to the joint 1. Accordingly, the heat generated at the amplifier circuit 81 can be quickly dissipated via the joint 1.

(21) In order to bond the first and second mounting surfaces 63 and 64 of the flexible circuit board 6 to the lateral portions 42B or legs 43 of the base 4, or in order to connect the amplifier circuit 81 and the electronic circuits 82 to the flexible circuit board 6, the mounting groove 12A is provided with the adhesion layer 9 made of adhesive or molding materials. Therefore, the bonding or the connection can be reinforced.

It should be appreciated that the invention is not limited to the above-described exemplary embodiment(s) but includes modifications and improvements as long as such modifications and improvements are compatible with the invention.

For instance, while the mounting groove 12A in which the legs 43 of the base 4 are inserted is provided at the bottom of the joint 1 in the above exemplary embodiment, the aspect of the invention does not necessarily require the mounting groove 12A, so that the bottom of the joint 1 may be flat.

Further, while the wall 42 of the base 4 includes the curved portions 42A and the flat-plate lateral portions 42B in the above exemplary embodiment, the wall 42 of the base 4 may be cylindrical in the aspect of the invention.

In the aspect of the invention, the base 4 may not be provided with the lip portions 42C, and the lower ends of the curved portions 42A may abut on the flange 12.

In the aspect of the invention, the spacer 7 may not be provided. When provided, the spacer 7 is not necessarily structured as in the above exemplary embodiment. For instance, the spacer 7 may be provided by a bottomed cylindrical member with the engaging projections 72D being omitted from the top plate 72.

Further, while the sensor is exemplified as a pressure sensor in the above exemplary embodiment, the sensor may be a differential pressure sensor, a temperature sensor or any other sensor in the aspect of the invention, as long as such a sensor includes a detector provided on the sensor module provided on the joint and adapted to be displaced by a pressure of a fluid.

While the lateral surfaces of the base 4, which are crosswise to the top 41 provided with the opening, are provided with a part of the flexible circuit board 6 and the part is provided with the electronic components 8 in the above exemplary embodiment, the electronic components 8 may be provided on a circuit board disposed separately in the housing 3 in the aspect of the invention.

While the legs 43 of the base 4 are each provided with the narrow portion 43A in the above exemplary embodiment, the narrow portion 43A may not be provided in the aspect of the invention, so that the legs 43 may be formed of a plate member.

What is claimed is:

1. A sensor, comprising:
   a joint provided with a port for introducing a target fluid;
   a sensor module provided on the joint and including a detector displaceable by a pressure of the introduced fluid;
   a housing accommodating the sensor module and provided with a terminal;
   a flexible circuit board for electrically connecting the detector of the sensor module with the terminal; and
   a cap-shaped base provided on the joint, a top of the base being provided with an opening through which the detector of the sensor module is exposed, the base having a wall, one side of the wall being connected with the top of the base, the other side of the wall being connected with the joint and an inner circumference of the wall being opposed to an outer circumference of the sensor module,
   a lateral surface of the wall being provided with a part of the flexible circuit board, the part of the flexible circuit board being provided with an electronic component.

2. The sensor according to claim 1, wherein the electronic component includes an amplifier circuit, and the amplifier circuit is positioned closer to the joint than the detector of the sensor module.

3. The sensor according to claim 1, wherein the lateral surface of the base is flat.

4. The sensor according to claim 3, wherein a portion crosswise with the lateral surface of the base is provided with a lip portion to be welded to the joint.

5. The sensor according to claim 1, wherein a spacer is provided over the base, and the spacer is bonded with the flexible circuit board.

6. A sensor, comprising:
   a joint provided with a port for introducing a target fluid;
   a sensor module provided on the joint and including a detector displaceable by a pressure of the introduced fluid;
   an electronic component electrically connected to the sensor module;
   a circuit board on which the electronic component is provided; and
   a base on which the circuit board is provided,
   the base comprising: a wall of which inner circumference is opposed to an outer circumference of the sensor module; and a leg coplanar with the wall,
   an end of the leg being inserted in a mounting groove opened in a bottom of the joint where the sensor module is provided, a space being defined between an outer surface of the leg and an outer wall of the mounting groove.

7. The sensor according to claim 6, wherein the outer surface of the leg of the base is provided with the electronic component, and the space is wider than a thickness of the electronic component.

8. The sensor according to claim 7, wherein the wall of the base comprises: a wall body; and a lip portion provided on an end of the wall body and engaged with a vicinity of an outer circumference of the mounting groove of the joint.

9. The sensor according to claim 8, wherein the lip portion is bent outwardly from the wall body to abut on the vicinity of the outer circumference of the mounting groove of the joint.

10. The sensor according to claim 9, wherein the lip portion is provided at two opposing positions while the leg includes a pair of legs provided at positions crosswise with the lip portion, and the pair of legs each intermediately include a narrow portion of which width dimension is reduced.

* * * * *